Oct. 24, 1967      T. C. ASH, JR      3,348,415

TEMPERATURE MEASURING DEVICE

Filed Dec. 1, 1964

INVENTOR
THOMAS C. ASH, JR.
BY
ATTORNEY

United States Patent Office 3,348,415
Patented Oct. 24, 1967

3,348,415
TEMPERATURE MEASURING DEVICE
Thomas C. Ash, Jr., Mount Holly, N.J., assignor to Turon, Inc., Philadelphia, Pa., a corporation of Pennsylvania
Filed Dec. 1, 1964, Ser. No. 415,013
3 Claims. (Cl. 73—362)

ABSTRACT OF THE DISCLOSURE

A temperature sensing device including a bridge network with a variable sensor element and a transistorized amplifier and metering circuit.

This invention relates to a device for measuring temperature. More particularly, the device is utilized to measure human temperature and to measure it externally of the body.

It is well known that the majority of temperature gauging devices presently in use by hospitals, doctors and the like for measuring human temperatures are of the glass tubular type having a mercury or alcohol pool therein. This type of thermometer measures temperature as a function of the expansion of the material within the tube when the thermometer is placed within an opening in the body. Taking temperature orally or rectally creates many problems. Generally the thermometer must be in place for a rather long time period so that the body temperature can properly act upon the material within the glass tube to cause the proper expansion. In many cases this causes discomfort to the patient.

It is desirable therefore, to be permitted to measure the temperature of the patient by some external measuring device. Moreover, it is desirable to be able to measure the patient's body temperature substantially instantaneously. Thus, for example, it would be desirable to place a temperature measuring device against the patient's forehead or other body part and to instantaneously have an indication of the temperature. This procedure is especially desirable in the case of children and elderly people, as well as those patients who are physically indisposed.

In accordance with this invention, a temperature sensing probe is provided which includes a temperature sensitive element, for example a thermistor, as part of a resistance bridge network. As the resistance of the thermistor or other temperature sensitive element varies in accordance with the temperature of the patient, the bridge network becomes unbalanced. The unbalancing of the bridge network permits current flow in one or another of two branches connected to the bridge. This current flow is amplified and applied to a meter circuit which is properly calibrated to register in terms of temperature.

Thus, it is clearly seen that one object of this invention is to provide a temperature measuring device.

Another object of this invention is to provide a temperature measuring device for measuring temperature externally of the patient.

Another object of this invention is to provide a relatively small, portable measuring device which is reliable.

Another object of this invention is to provide a device for measuring temperatures instantaneously.

The nature and characteristic features of the invention will be more readily understood from the following description taken in connection with the accompanying drawings forming part thereof in which.

It should, of course, be understood that the description and drawings herein are illustrative merely, and that various modifications and changes can be made in the structure disclosed without departing from the spirit of the invention.

Like numerals refer to like parts throughout the several views.

Figure 1:
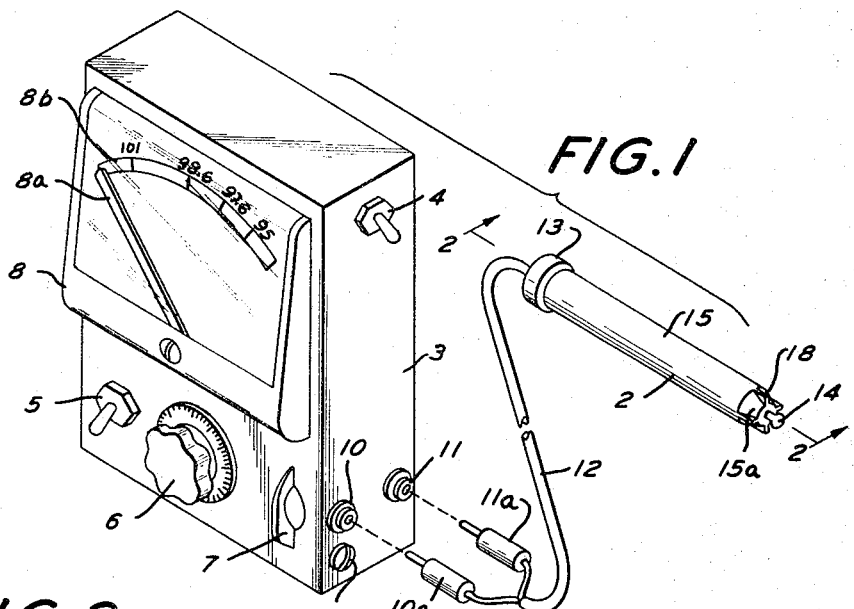
FIGURE 1 is a perspective view of the meter case including the temperature scale, and the temperature sensitive probe.

Referring now to FIG. 1, there is shown generally a meter case 1 and a temperature sensitive probe 2. The meter case 1, which may be any suitable material, includes the main housing or base 3 and the meter 8. The meter comprises indicator arm 8a and scale 8b where the scale is the range of temperature which may be indicated. As will become apparent, meter 8 should typically be an ammeter. The scale 8b preferably has a range between approximately 94° F. and 102° F. This temperature range is suggested inasmuch as these are standard ranges or extremes for human temperature. The invention is not, however, to be limited by the end points of the scale range. Switch 4, shown mounted in base 3, may be utilized to open a portion of the circuitry shown in FIG. 4 during calibration of the meter. Switch 4 may be eliminated if proper precautions are taken, such as having the meter 8 properly shielded against ambient temperature changes. Switch 5, also shown mounted in base 3, is connected in the electrical circuit shown in FIG. 4 to control the current flow therein and, therefore, reading by the meter 8. If current drain on the battery is not critical, switch 5 may be eliminated through relatively minor modifications in the circuit. Knobs 6 and 7 are shown mounted on the base 3 and each represents a variable resistor or potentiometer in the circuit shown in FIG. 4. For convenience, knob 7 may be considered as the coarse adjustment potentiometer while knob 6 represents the fine adjustment potentiometer. By properly adjusting these potentiometers, the meter may be calibrated such that the indicator 8a is aligned with the midpoint of the range 8b. Typically, this midpoint may be represented by 98.6° F. Of course, the meter may be calibrated to either end of the scale or to some other point but this does not alter the basic concepts of the invention.

The screw 9 may be utilized to hold the meter case base structure together. The receptacles or jacks 10 and 11 are mounted in the base 3 and are connected to the bridge network of the circuit shown in FIG. 4. These receptacles may be any type of reliable receptacles such as phono jacks or the like. The plugs 10a and 11a may each be any type of reliable plug which mate with the associated receptacle 10 and 11. These plugs are each connected to one wire of cable 12. Cable 12 is attached to the heat sensing probe 2.

Probe 2 consists of a tubular element 15 which may be fabricated of a suitable metal, metal alloy or plastic such that it dissipates heat sufficiently and properly so as to avoid acting as a heat source. This tubular element 15 should be hollow such that the cable 12 passes therethrough. The cap piece 13 is attached to one end of the tube 15 to provide a closure thereto and to assist in the retention of the cable 12, as may be necessary in some cases. Cap 13 may be fastened to tube 15 by means of a force fit or screw threads or any similar fastening means. The other end of hollow tube 15 incorporates the tapered portion 15a through which projects the heat sensing element 14. The heat sensing element 14 may comprise a thermistor, for example. A thermistor is well known in the art as a resistance element fabricated of a semiconducting material which exhibits a high negative temperature coefficient of resistivity. Thus, the sensing element of the probe exhibits a large resistance change per degree of temperature change at the sensing end thereof.

Figure 2:
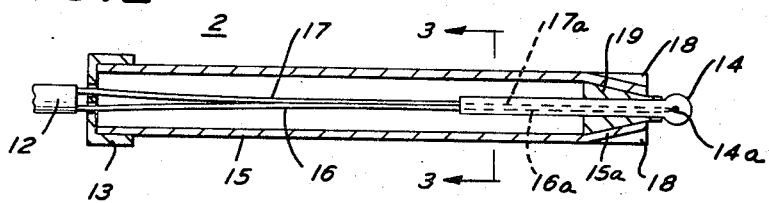
FIG. 2 is a longitudinal sectional view of the probe taken along the line 2—2 in FIG. 1.

Referring now to FIG. 2, there is shown a longitudinal sectional view of the probe 2 taken along line 2—2 of FIG. 1. The tube 15 is shown as being hollow and having the cap piece 13 attached at one end thereof. The cable 12 is shown as being divided into insulated wires 16 and 17. The wires 16 and 17 are connected to the thermistor 14 by means of the conductors 16a and 17a, respectively (shown dashed). Wires 16a and 17a are joined together at the coupling point 14a. Coupling point 14a may represent any type of satisfactory junction such as a thermistor bead. The temperature sensitive element 14 incorporates the wires 16a and 17a as well as the coupling point 14a. The thermistor is shown as passing through the opening in the tapered end 15a of the tube 15. On either side of the temperature sensitive element 14 there is shown a heat insulating or radiating material 19. The heat sink material 19 is utilized to assist in dissipation of excessive heat at the sensitive probe end. The amount of material used in the heat sink 19 (which surrounds the sensing element 14) would vary as a function of a number of variables including the type of thermistor or other sensor, the temperatures to be taken, and the like. Furthermore, the type and amount of heat sink material utilized would somewhat determine the point at which the circuit stabilized. As an alternative, the heat sink material 19 could be replaced by or augmented by fins 18. The fins 18 are mounted at the periphery of the tube 15 axially as shown to radiate excessive heat or thermal energy. As another alternative the fins 18 could extend radially from the tube 15 and completely encircle the tube as a plurality of parallel disks. In this latter alternative, fins 18 would be arranged perpendicular to the fins 18 shown in FIG. 2. The fins 18 and the heat sink material 19 may be used alternatively. In addition, the dissipating end (heat sink material 19) or radiating components (fins 18) may be used conjointly.

Figure 3:
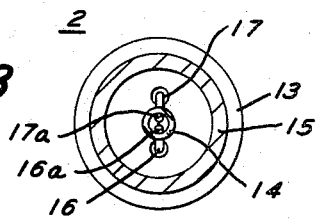
FIG. 3 is a transverse sectional view, enlarged, of the probe taken along the line 3—3 in FIG. 2.

Referring now to FIG. 3, there is shown a transverse cross-sectional view of the probe 2 taken along the line 3—3 of FIG. 2. Thus, as shown, cap piece 13 closes and forms one end of tube 15. Wires 17a and 16a are shown passing through the heat sensing element 14 and becoming the insulated wires 17 and 16 respectively. Wires 16 and 17 pass through holes formed in cap pieces 13 and join to form cable 12 (FIGS. 1 and 2) which is plugged into the meter case 1 (FIG. 1).

The meter case shown is of the order of about 5 inches by 8 inches by 1½ inches. The meter case is truly portable. Also shown and described is a temperature sensitive probe which may be selectively connected to said meter case. The probe includes a heat sensing element at one end thereof. The probe 2 is adapted to have the temperature sensing element 14 thereof placed against a body portion of the patient to detect the temperature thereat. This temperature is then registered on the scale 8b by means of indicator 8a in the meter 8.

Figure 4:
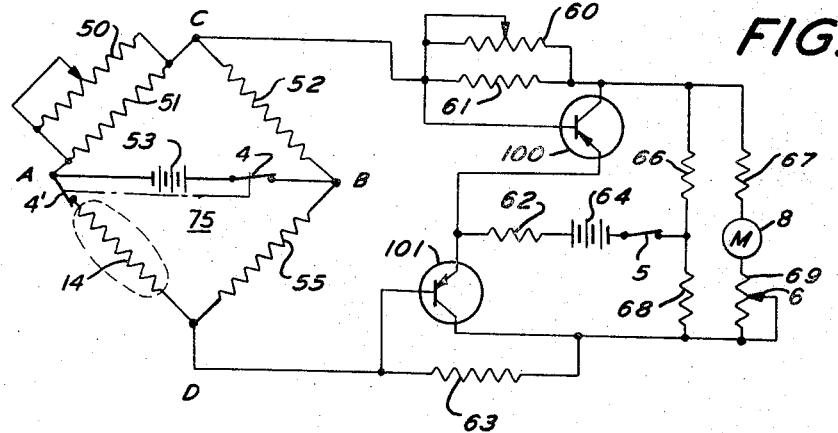
FIG. 4 is a schematic diagram of the electrical circuitry which is utilized in this device.

Referring now to FIG. 4, there is shown a schematic diagram of the circuit which includes the temperature sensitive device. A Wheatstone bridge or similar type of bridge is indicated generally at 75. In this bridge, resistor branches 52 and 55 are matched impedances and may be approximately 680 ohms. Resistor branches 52 and 55 are connected together at node B of the bridge network. Resistor branch 51 is connected in parallel with a variable resistor 50. Resistor 51 may be on the order of 500 ohms while the variable resistor 50 may be on the order of 3,000 ohms. This parallel combination of resistors is connected to resistor branch 52 at node C and provides for variability in the bridge circuit such that balance may be achieved when different probes or thermistors are inserted in the circuit. Resistance branch 14 represents the temperature sensitive device and is connected to branch 55 at node D of the bridge network. Resistance branch 14 is further connected to node A via switch 58. Potential source 53 may be any suitable source and is shown, for example, as a 1.5 battery. Source 53 is connected between nodes A and B in a series arrangement with switch 59. Switches 4 and 4' may be utilized to open the respective circuit branches in which they are included when meter 70 is calibrated. These switches may be ganged together, if desired.

Connected to nodes C and D of the bridge network is the meter and amplifier portion of the temperature measuring circuit. Specifically, connected to node D is the base electrode of transistor 101. Also connected to node D is one terminal of bias resistor 63. Another terminal of the bias resistor, which may be on the order of 5600 ohms is connected to the collector electrode of the transistor 101 and provides a self-biasing arrangement for the transistor. The emitter of transistor 101 is connected to the emitter of transistor 100. The base of transistor 100 is connected to node C of bridge network 75. Also connected to the base of transistor 100 is one terminal of fixed resistor 61 which may be on the order of 6800 ohms and one terminal or variable resistor 60 which may be on the order of 15,000 ohms. Another terminal of each of resistors 60 and 61 is connected to the collector electrode of transistor 100. Variable resistor 60 permits the variation in the bias resistance of transistor 100 in order that the transistors need not be identically matched. This permits the advantage of less strict tolerances being placed on the transistors and has the effect of lowering the cost of manufacture and the criticality of the transistor characteristics. Of course, although the transistors are shown as PNP type transistors, NPN transistors may be used with only minor modifications in the circuit.

The emitter electrodes of transistors 100 and 101, in addition to being joined together, are connected to one terminal of resistor 62 which may be on the order of 10 ohms. Another terminal of resistor 62 is connected to one terminal of source 64 which is shown as a 1.5 volt battery, for example. Another terminal of source 64 is connected to one contact of switch 5, another contact of which is connected to the midpoint or junction of one terminal of each of the series connected resistors 66 and 68. Each of resistors 66 and 68 may be approximately 180 ohms. Connected in parallel with the series resistors 66 and 68 is the series arrangement comprising resistors 67 and 69, each of which may be approximately 400 ohms, and which are joined together through ammeter 8. Resistor 69 is shown as a variable resistor in order that correction may be made in the latter named series network whereby the meter 70 may be properly calibrated. Potentiometer 69 may be considered as being the fine adjustment for the circuit. The junction between parallel resistors 66 and 67 is connected to the collector electrode of transistor 100 while the junction of parallel resistor 68 and potentiometer 69 is connected to the collector electrode of transistor 101.

In operation, meter 8 may be calibrated to any desired point for example 98.6° F. on scale 8b of meter 8 (see FIG. 1) by means of a suitable calibrating scheme. For example, switches 4 and 4', which may be ganged switches, may be opened whereupon only identical branches 52 and 55 of bridge 75 the coarse and fine adjustment potentiometers 56 and 69, respectively, varied until the meter 8 is calibrated. The switches 4 and 4' are then closed and a reading is taken by means of application of the thermistor probe, represented by resistor 14. The resistance value of the probe and resistor 14 will vary in accordance with the temperature at the probe end designated by temperature sensitive element 14. As the resistance of element 14 varies, bridge 75 becomes unbalanced and provides signals at the bases of the transistors 100 and 101. For example, if the resistance of branch 14 becomes greater, the potential exhibited at node C will become relatively lower than the potential exhibited at node D. This will render transistor 100 conductive thereby causing current to flow therethrough and through meter 8. On the contrary, if the resistance value of resistor branch 14 becomes relatively lower, transistor 101 will be rendered conductive thereby supplying current to meter 8. Depending upon which of the transistors 100 or 101 is conductive, the current flow through the resistor branch 67, 69 will vary in direction. This variation in direction determines the sense of the deflection of needle 8a in meter 8 (see FIGURE 1). The extent or arc of deflection of needle 8a, whereby the temperature of the patient may be directly read on scale 8b, is determined by the magnitude of the current applied to meter 8. The magnitude of the current is a function of the resistance of branch 14 and the operation of the transistors 100 and 101.

Thus, it may be seen that there has been described a means for indicating body temperatures which are detected by a temperature sensitive element. The indicating meter is controlled by circuitry in which the temperature sensitive element is included as a component thereof. The circuit includes a bridge network which creates current flow when unbalanced, which current flow is amplified by transistor amplifiers and is applied to the meter. In the event that the bridge network is not unbalanced, there is no current supplied to the transistor amplifiers whereby no net current is supplied to the meter. This temperature measuring device can be utilized for instantaneously obtaining an external temperature reading from a patient. The advantages of this device are noted above.

I claim:

1. In combination, a resistance bridge network, one arm of said bridge network comprising a temperature sensitive element, said temperature sensitive element characterized by a large resistance change per degree of temperature change, said temperature sensitive element adapted to be placed adjacent the human body to detect the temperature thereof as a function of resistance, potential source means connected across said bridge network in one direction and between one pair of nodes to provide current flow in said bridge when unbalanced, first and second transistors having the respective base electrodes thereof connected to another pair of nodes across said bridge network in another direction, self-biasing resistors connected between the base and collector electrodes of each of said first and second transistors, potential supplying means connected between the emitter and collector electrodes of each of said first and second transistors to selectively produce current flow therethrough, and meter means connected between the collector electrodes of said first and second transistors to indicate the sense and magnitude of current produced thereby.

2. The combination recited in claim 1 wherein said temperature sensitive element comprises a thermistor.

3. In combination, a resistance bridge network having two pair of nodes, one arm of said bridge network including a thermistor, said thermistor characterized by a large resistance change per degree of temperature change, said thermistor being contained in a probe which is adapted to be placed adjacent the human body to detect the temperature thereof as a function of resistance, potential source means connected across said bridge network in one direction and between one pair of nodes to provide current flow in said bridge when unbalanced, first and second transistors having the respective base electrodes thereof connected to another pair of nodes across said bridge network in another direction, self-biasing resistors connected between the base and collector electrodes of each of said first and second transistors, potential supplying means connected between the emitter and collector electrodes of each of said first and second transistors to selectively produce current flow therethrough, meter means connected between the collector electrodes of said first and second transistors to indicate the sense and magnitude of current produced thereby, and variable resistor means connected to said meter to permit calibration thereof.

References Cited
UNITED STATES PATENTS

| | | | |
|---|---|---|---|
| 2,442,823 | 6/1948 | Polye | 73—362 |
| 2,818,482 | 12/1957 | Bennett | 73—362 |
| 3,060,743 | 10/1962 | Mack | 73—362 |
| 3,165,929 | 1/1965 | Nöller | 73—362 |

LOUIS R. PRINCE, *Primary Examiner.*

FREDERICK SHOON, *Assistant Examiner.*